3,319,808
AUTOMATIC BIN FILLING SYSTEM FOR FREEFLOWING MATERIALS
Walter J. Sackett, Sr., Baltimore, Md., assignor to A. J. Sackett & Sons Company, Baltimore, Md., a corporation of Maryland
Filed Aug. 17, 1965, Ser. No. 480,466
6 Claims. (Cl. 214—17)

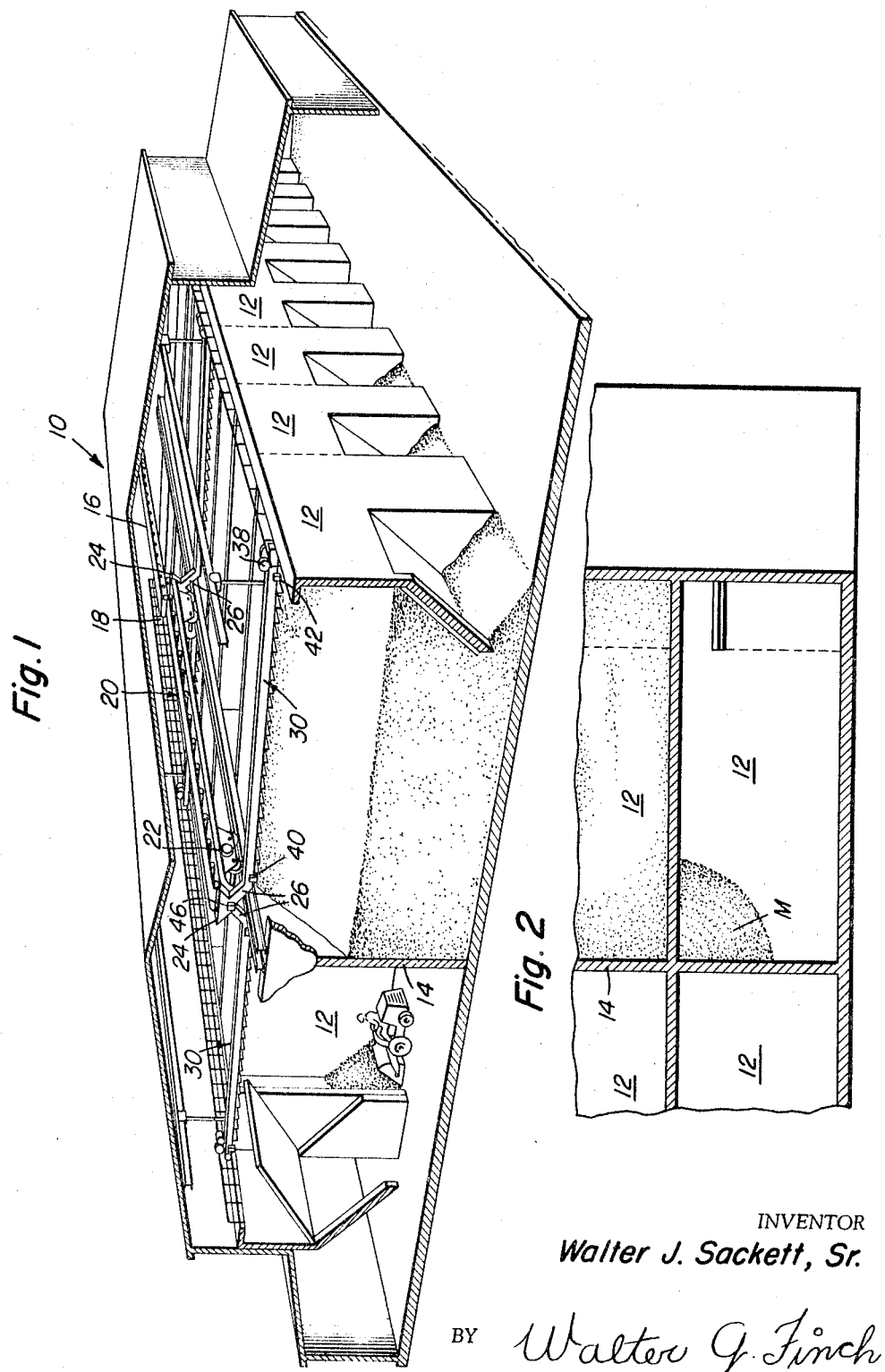

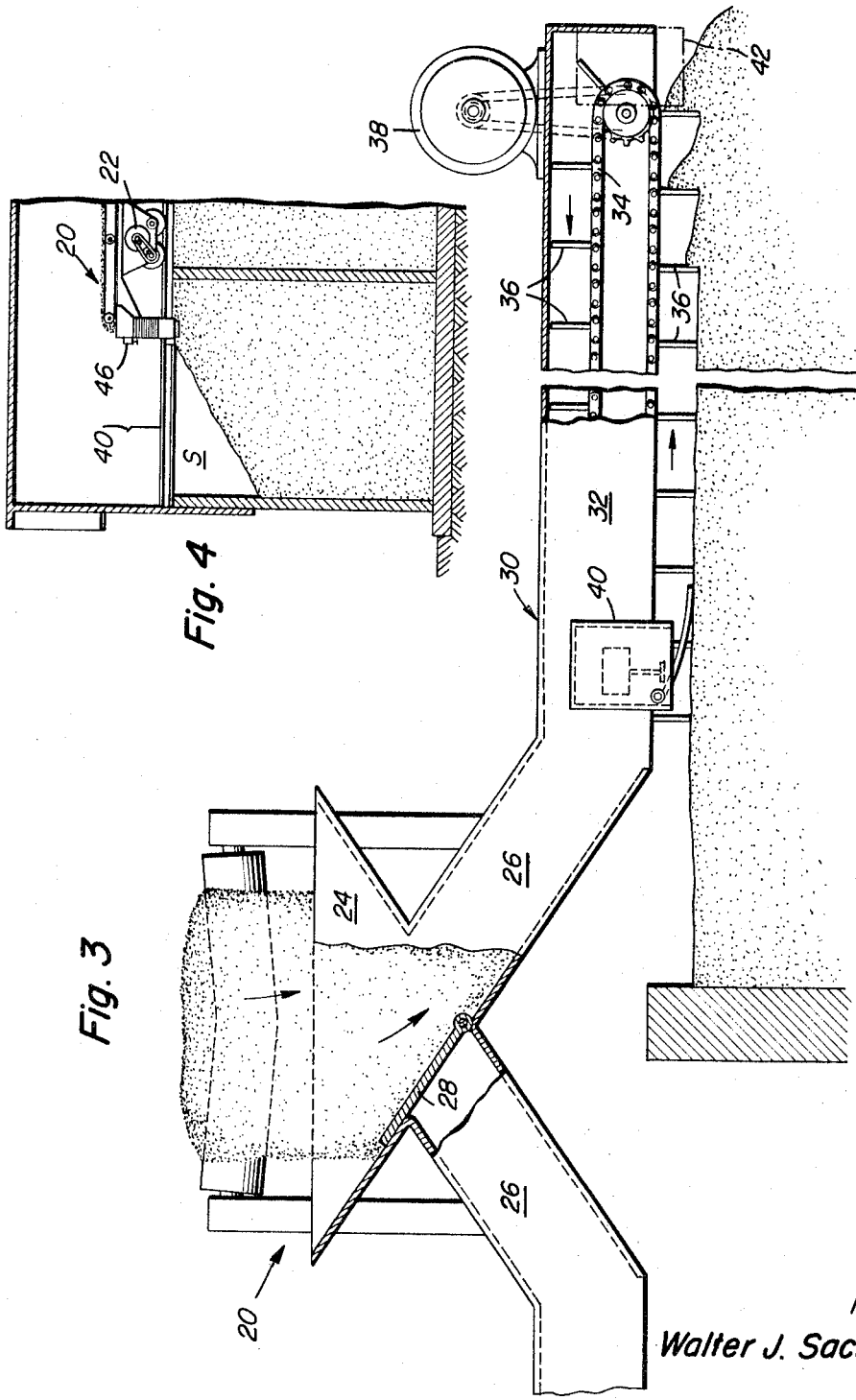

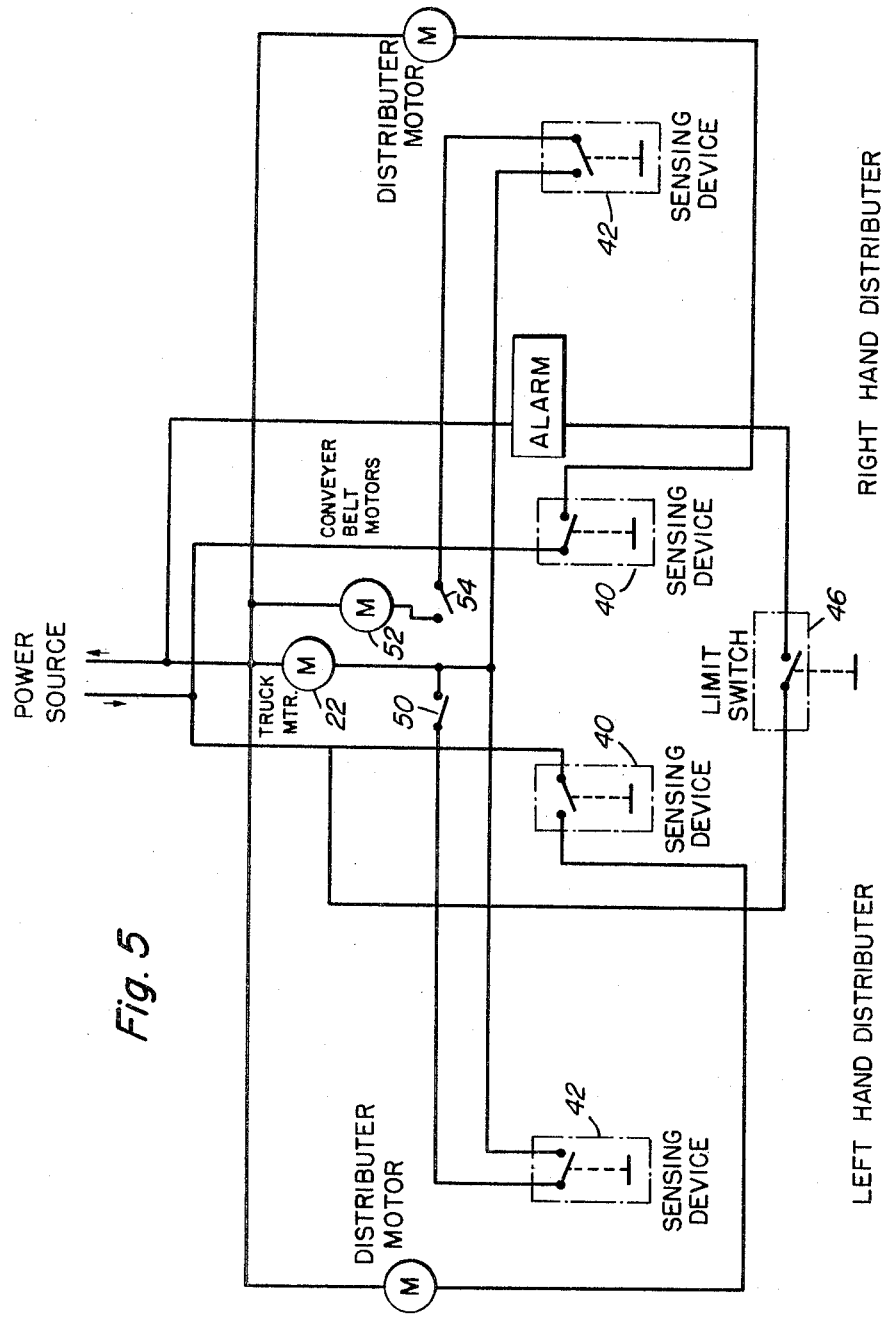

This invention relates generally to storage buildings, and more particularly it pertains to a bin arrangement utilizing a power driven distributing type conveyor.

Because free flowing material, such as feed and fertilizer forms an angle-of-respose mound, it is often difficult to completely fill rectangular bins from a chute without considerable manual supervision.

It is an object of this invention to provide a semiautomatic storage plant for handling and storing a plurality of different materials of granular nature which is rapid in operation and efficient to operate.

Another object of this invention is to provide a bin loader which automatically tops the filling thereof.

Still another object of this invention is to provide an elongated mound builder machine useful for piling up material such as fertilizer, dirt, and mine tailings.

Other objects and attendant advantages of this invention will become more readily appearant and understood from the following detailed specification and accompanying drawings in which:

FIG. 1 is a perspective view, partly broken away, showing a storage plant for granular materials;

FIG. 2 is a top view of a bin showing the initial stage of a filling operation;

FIG. 3 is an enlarged detail view of the filler machine showing a bin being topped with granular material;

FIG. 4 is a cross sectional end view of a bin; and

FIG. 5 is a typical schematic diagram of the electrical system for operating the bin filler machine.

Referring now to the details of the drawings, the plant 10 of this invention consists of a plurality of open topped rectangular bins 21 located adjacent to each other and arranged in two rows having a common wall 14 as shown in FIGS. 1 and 2.

A conveyor 16 brings granular material for storage into the plant 10 from manufacturing process or railroad cars (not shown) and discharges it at a central point 18 in the plant 10 onto an H-shaped traveling conveyor 20. This traveling conveyor 20 is movable lengthwise of the plant 10 on a line over the central common wall 14 of the two rows of bins 12.

By means of a truck motor 22, the traveling conveyor 20 can be positioned to discharge (from one end or the other) into any bin 12 of the plant. For this purpose the belt of the conveyor 20 is reversible in direction of operation. This traveling conveyor 20 is provided with hoppers 24 on each end, each hopper having a pair of oppositely directed chutes 26 terminating over opposite sides of the common wall 14. A valve 28 shown in FIG. 3 is positionable to allow only one chute 26 to be used at a time.

A distributor 30 extends horizontally on the end of each chute 26 and consists of an elongated open bottom housing 32 in which is mounted an endless chain 34 equipped with spaced paddles 36. This chain 34 can be driven by a motor 38 in the direction of the arrows in FIG. 3.

The inner end of the distributor 30 is provided with a sensing device 40, and the outer end thereof is also provided with a similar sensing device 42. These sensing devices 40 and 42 close in electrical circuit when granular material piles up beneath them.

With supplementary reference to the schematic diagram FIG. 5, the operation of the plant 10 will now be described. The operator first closes a manual switch 50 which energizes the truck motor 22 of the traveling conveyor 20. The operator shuts it off when the chute 26 is positioned over the corner of an empty bin 26 and then starts the conveyor belt motor (or motors) 52 by closing a switch 54. Conveyor 16 brings material into the plant, deposits it on the traveling conveyor 20, the latter carries it on and dumps it into its hopper 24.

The material then goes down chute 26 and emerges at the lower end to fall into the bin 12. Here in the corner of bin 12, a pile of material M begins to grow as shown in FIG. 2. When this pile of material builds up, the point thereof engages the inner sensing device 40 directly above on the distributor 30. This closes the circuit to the motor 38 which drives the paddle chain 34.

The paddles 36 push material along and elongate the pile which builds up as shown in FIG. 1 until the outer sensing device 42 is contacted and closes. This starts the truck motor 22, which moves the entire traveling conveyor 20 so as to discharge into the space S shown in FIG. 4. As the conveyor 20 moves, both sensing devices 40 and 42 are moved off the pile of material and open their circuits stopping both the truck motor 22 and distributor motor 38. The latter motor 38 will start up again when the space S has received a pile of material M reaching the inner sensing device 40. This action of pile elongation continues until the bin 12 is completely topped.

A stop finger 44 in the line of motion of the travelling conveyor 20 will finally engage a limit switch 46 to sound an alarm 48 or by electrical interlocks (not shown) will stop the conveyor from proceeding further.

Obviously, many modifications and variations of the present invention are possible in light of the above teachings. It is, therefore, to be understood that within the scope of the appended claims the invention may be practiced otherwise than as specifically described.

What is claimed is:

1. Apparatus for filling a bin with granular material, comprising shiftable means for discharging said granular material into one end of said bin to form a pile of said granular material therein, means for scraping off the top of said pile after it reaches a certain height and distributing the resultant scraped-off granular material progressively across said bin to the opposite end thereof, means responsive to a predetermined height of granular material piled at said opposite end for halting operation of said scraping means, and means responsive to said predetermined height for shifting said discharging means to discharge said granular material into a relatively empty space in said bin.

2. The apparatus as recited in claim 1, and additionally means responsive to said certain height of said pile for actuating said scraping means.

3. The apparatus as recited in claim 1, wherein the direction of said shifting of said discharging means is transverse to the direction of said scraping and distributing.

4. The apparatus as recited in claim 1, and additionally means for limiting said shifting of said discharging means to retain said discharge of said granular material in said bin.

5. The apparatus as recited in claim 1, wherein said discharging means includes a chute having a discharge end, and said scraping means includes an elongated open-bottomed housing extending substantially horizontally from said chute and having conveying structure position therealong, with said conveying structure having spaced paddle elements for scraping said granular material in said pile away from said discharge end of said chute.

6. The apparatus as recited in claim 5, wherein said conveyor structure includes a horizontally looped endless chain having an upper flight and a lower flight, with said spaced paddle elements being mounted on said chain and with the direction of movement thereof being such that said paddle elements along said lower flight move away from said discharge end of said chute.

References Cited by the Examiner

UNITED STATES PATENTS

| | | | |
|---|---|---|---|
| 2,348,056 | 5/1944 | Cheely et al. | 214—17 |
| 2,705,909 | 4/1955 | Smith | 198—68 X |
| 2,911,892 | 11/1959 | Pollitz | 214—17 |

GERALD M. FORLENZA, *Primary Examiner.*

ROBERT G. SHERIDAN, *Examiner.*